United States Patent [19]
Von Holdt

[11] Patent Number: 4,775,130
[45] Date of Patent: Oct. 4, 1988

[54] MOLD WITH WEAR MEMBER
[76] Inventor: John W. Von Holdt, 6864 Lexington La., Niles, Ill. 60648
[21] Appl. No.: 77,419
[22] Filed: Jul. 23, 1987
[51] Int. Cl.$^4$ ............................................. B29C 45/36
[52] U.S. Cl. .................................. 249/144; 249/105; 249/175; 425/168; 425/192 R; 425/577
[58] Field of Search ............... 425/150, 168, 182, 183, 425/190, 192 R, 195, 542, 577; 249/135, 144, 175, 63, 64, 105

[56] References Cited
U.S. PATENT DOCUMENTS 3,932,085 1/1976 Horbach ............................ 425/577
4,520,991 6/1985 Letica ................................ 425/577

Primary Examiner—Jay H. Woo
Assistant Examiner—James C. Housel
Attorney, Agent, or Firm—Charles F. Pigott, Jr.; Garrettson Ellis

[57] ABSTRACT

A mold, typically an injection mold, having a mold core and a mold cavity has centering rib means at its parting line defined on one of the core and cavity, projecting in the closed position into a groove defined by the other of the mold core and cavity in the closed position. By this invention a wear member is removably secured in the groove at a position which is radially inward of the centering rib. The wear member defines a radially outer face that is acutely angled outwardly from the longitudinal axis of the mold relative to the centering rib. The radially inner surface of the centering rib defines a plane parallel to the radially outer face and positioned whereby the radially outer face and radially inner surface abut each other in the closed position. The radially outer surface of the centering rib is acutely angled inwardly relative to the longitudinal axis and centering rib means, the radially outer surface being parallel to and substantially in abutting relation with the radially outer side of the groove in the closed position. The wear member may be designed to endure most of the wear that takes place in the mold centering system during operation. Then, the wear member, which is relatively inexpensive, may be replaced after it is unduly worn, resulting in a great improvement in mold maintenance.

27 Claims, 1 Drawing Sheet

MOLD WITH WEAR MEMBER

BACKGROUND OF THE INVENTION

In the molding art, and particularly in large injection molds, there can be a problem of mold centering because the pressures imparted within relatively large mold chambers by the molding compound as it flows in can cause a small temporary warpage of even large steel molds. Additionally, slight misalignments of the mold cavity and the mold core may take place, all of which may cause errors in the dimensioning of the products molded therein.

To account for this, in the prior art, molds utilize various mating shoulders and recesses respectively in the mold core and mold cavity which assist in the centering of the core and cavity in their exact, desired transverse position relative to each other.

In one prior art embodiment, a portion of the mold cavity is positioned in the closed position, inside of a retaining portion of the mold core so that the mold core resists expansion of the mold cavity due to pressure in the molding chamber, and to improve the centering of the core and cavity. However, at the abutting, lateral faces of these two portions, a significant amount of wear can take place, especially when the core and cavity are opened while the mold chamber remains pressurized. Eventually, this wear must be repaired.

In another design of centering system for an injection mold, an adjustably advanceable ring is carried on the mold core, to retain an inner portion of the mold cavity to prevent its expansion and to assist in its centering. As the ring wears, it may be advanced to account for the wear and reused. However, because the ring is advanceable, there must be a certain amount of loose fitting of the ring in the recess of the mold core where it resides. Thus, such an area does not assist significantly in the sealing against the formation of thin flashing of molding compound, so that the quality of the products manufactured therein may suffer.

In accordance with this invention a mold is provided, typically an injection mold, in which good alignment between the core and cavity may be achieved, while the resulting wear resulting from such good alignment may be "focused" onto an inexpensive, easily replaceable wear member. Thus, when the wear member has worn to an excessive degree, it may simply be replaced with little difficulty and time. Additionally, the wear member may be a relatively simple, soft metal ring of low cost.

DESCRIPTION OF THE INVENTION

In this invention, a mold is disclosed which comprises a mold core and a mold cavity moveable between open and closed positions and together defining a molding chamber in the closed position. As is conventional, sprue means are provided for supplying plastic molding compound to the molding chamber in the closed position. The mold core and cavity define a parting line between them in the closed position, and one of the mold core and mold cavity defines centering rib means at the parting line and defining radially inner and outer surfaces. The rib means project into a groove defined by the other of the mold core and cavity in the closed position.

In accordance with this invention, a wear member is removably secured, typically by bolts or the like, in the groove at a position which is typically radially inward of the centering rib means. The wear member defines a radially outer face that is acutely angled outwardly from the longitudinal axis of the mold relative to the centering rib means. By this it is meant that if one were very small and standing at the base of the centering rib means looking outwardly toward the other mold portion, the acutely angled, radially outward face of the wear member would have an outer portion that was farther from the center line of the mold than its inner portion, against which such an observer might be standing.

The radially inner surface of the centering rib means defines a plane parallel to the radially outer face of the wear member, the radially inner surface being positioned so that the radially outer face and radially inner surface abut each other, and typically preload each other in the closed position.

The radially outer surface of the centering rib means is acutely angled inwardly relative to the longitudinal axis and centering rib means. Such radially outer surface is parallel to and in substantially abutting relation with the radially outer side of the groove in the closed position.

As a result of this, especially when the parts are positioned so that preload takes place between the radially outer face and radially inner surface, wear to the system in operation is focused on the wear member, yet the mold core and cavity may be precisely transversely positioned to each other in the closed position during molding.

It is generally preferred for the wear member to be made of a softer material than the mold core and cavity. This increases the "focusing" of the wear in the wear member, while other portions of the mold core and cavity wear at a much slower rate, or not at all.

Also, the centering ribs and the groove may by of annular shape surrounding the molding chamber, as a preferred configuration. Similarly, the wear member may be of annular shape, surrounding the molding chamber.

The radially outer face of the wear member and the radially inner surface of the centering rib means may preferably be acutely angled outwardly at 5 to 30 degrees, and most preferably about 10 to 20 degrees. On the other hand, the radially outer surface of the centering rib means and the radially outer side of the groove are preferably acutely angled inwardly at an angle of 10 to 45 degrees. This last named angle is preferably greater than the angle of the radially outer face of the wear member. Accordingly, as the mold closes, this relationship causes more of the wearing stress to be focused against the radially outer face of the wear member rather than the outer surface of the centering rib means and the radially outer side of the groove. Preferably, the radially outer surface of the centering rib means and the radially outer side of the groove are acutely angled inwardly at 15 to 30 degrees.

DESCRIPTION OF SPECIFIC EMBODIMENTS

Figure 1:
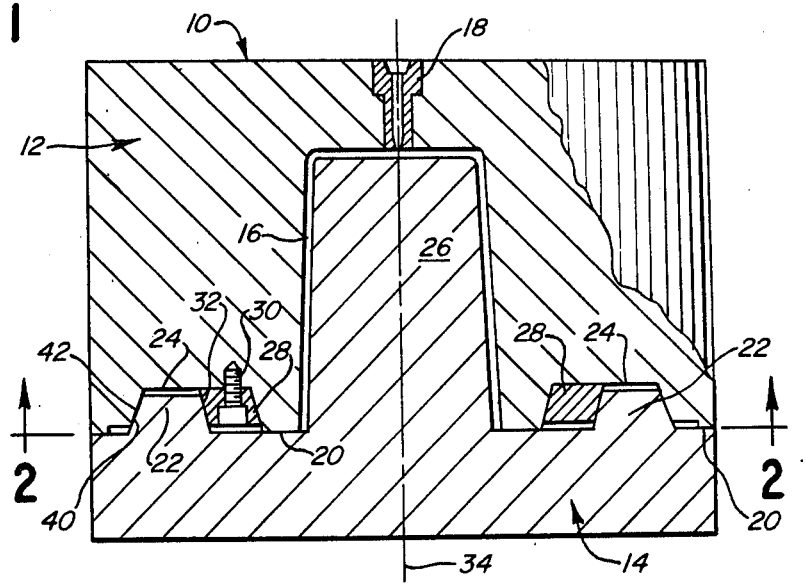
FIG. 1 is a longitudinal sectional view of an injection molding system in accordance with this invention, with many conventional parts commonly used with injection molds being omitted for purposes of clarity.

Referring to the drawings, an injection mold 10 is disclosed which is typically of large size, with many typical parts normally found in a commerical mold such as cooling water lines and the like being deleted for purposes of clarity. As is conventional, mold 10 comprises a mold cavity 12 and a mold core 14, with cavity 12 and core 14 being moveable in conventional manner back and forth between open and closed positions.

FIG. 1 defines mold 10 in its closed position. While in the closed position, a molding chamber 16 between mold portions 12, 14 is defined, the particular chamber shown being of the shape to manufacture a bucket or the like, although this invention may be used in molds to manufacture an unlimited number of different types of products.

Sprue means 18, of conventional design, may be present for supplying plastic molding compound to molding chamber 16 when the mold is in the closed position.

Mold core 14 and cavity 12 define, as is conventional, a parting line 20 between them in the closed position. There is defined by the mold core, in this particular embodiment, annular centering rib means 22 at parting line 20 with rib means 22 projecting into an annular groove 24 defined by mold cavity 12. Annular centering rib 22 within groove 24 serves to control the transverse centering of the respective mold parts 12, 14 so that as molding compound is forced into molding chamber 16, the transverse forces generated by that process will not cause mold cavity 12 and core 14 to become misaligned. Molding chamber 16 can be seen to surround core element 26, which is part of mold core 14.

Figure 2:
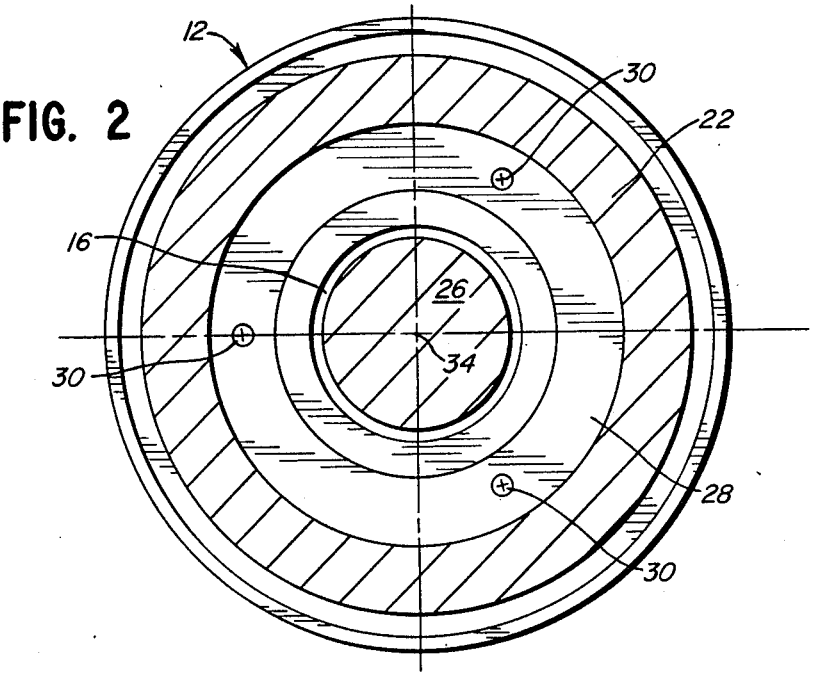
FIG. 2 is a sectional view taken along line 2—2 of FIG. 1.

In accordance with this invention, a wear ring 28 is provided, typically being made of a metal which is softer than the steel from which annular centering rib 22 is made. Wear ring 28 is held to the inside surface of mold cavity 12 by a plurality of bolts 30, as shown particularly in FIG. 2. It can be seen that wear ring 28 is thus removably secured in groove 24 at a position which is radially inward from annular centering rib 22.

Wear ring 28 defines a radially outer face 32 which is acutely angled outwardly from the longitudinal axis 34 of the mold relative to centering rib or ring 22. By this it is meant that the outer portion of face 32, relative to the base of centering rib 22, is spaced farther from axis 34 than the inner portion of face 32 from the same perspective, as shown in the drawings.

Figure 3:
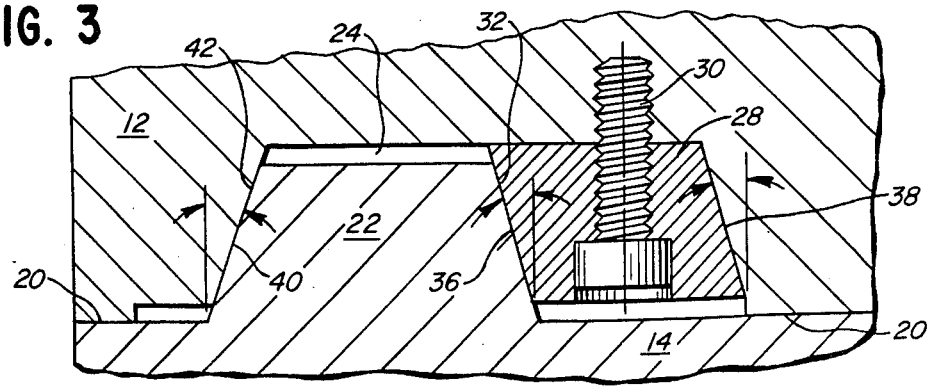
FIG. 3 is an enlarged, fragmentary view of a portion of FIG. 1.

Additionally, the radially inner surface 36 (FIG. 3) of centering rib 22 is shown to be parallel to and in abutting relation with outer face 32 of wear ring 28. Preferably, the members are positioned so that when the mold is in closed position, the abutting faces 32, 36 are under a substantial preload pressure against each other, to assure that a substantial portion of the load of the molding stresses will be passed between the junction of faces 32, 36. The angle of faces 32 and 36 to center line 34 in this embodiment may be about 15 degrees. Likewise, the angle of opposed, radially inner face 38 of wear ring 28, and the wall of the mold which it abuts, may be about 15 degrees as well, although this angle is seen to be less critical since this junction is off of parting line 20. In fact, the angle of face 38 may be greater or less than that shown.

The radially outer surface 40 of centering ring 22 is acutely angled inwardly as shown in the drawings, relative to longitudinal axis 34. Also, radially outer surface 40 is, in the closed position of the mold, in substantially abutting relation with the radially outer side 42 of groove 24. Because of the load imposed between faces 32, 36 when mold 10 is in its closed position, there is correspondingly less load imposed between faces 40, 42. This is particularly so as pressurized molding compound is forced into molding chamber 16. As the high pressures urge mold cavity 12 to expand (on the order of one thousandth of an inch or so) more loading pressure is applied between faces 32, 36, and faces 40, 42 correspondingly experience reduced load against each other.

Accordingly, transverse orientation and centering of mold cavity 12 and mold core 14 may be closely controlled by the interaction of centering ring 22 in groove 24 and particularly the positioning of the respective faces 32, 36, and 40, 42. However, the great majority of the lateral pressures encountered against such faces or sides are carried by the abutting faces 32, 36, while sparing abutting faces 40, 42. Accordingly, as mold 10 repeatedly breaks open out of its closed, molding position as molding chamber 16 is pressurized, the wear encountered by the various sliding lateral surfaces is strongly directed toward surfaces 32, 36 and away from surfaces 40, 42. In the preferred circumstance that wear ring 28 is made of a metal which is softer than the metal of which centering ring 22 is made, the situation can be arranged so that virtually all of the wear takes place in wear ring 28 and nowhere else.

As wear ring 28 begins to show its wear, bolts 30 may be removed and wear ring 28 rotated, to reduce the effects of systematic wear which takes place during the continued operation of the mold. Alternatively, wear ring 28 is easily removed and replaced, being a relatively inexpensive part, particularly when compared with the cost that would be incurred by repairing the effects of wear on cavity 12 and core 14.

Additionally, the angle of surface 40 and side 42 to mold axis 34 may be about 20 degrees, larger than the angle of faces 32 and 36. The effect of this, on mold breakout from the closed, molding position, is to cause faces 40, 42 to separate more quickly and easily than faces 32, 36, for a further reduction of the wear against faces 40, 42.

Accordingly, a mold is disclosed which, in accordance with this invention, may operate with good centering characteristics so that the molded products are of uniform, desired dimension without significant deviation therefrom. At the same time, the wearing of the mold, which naturally results from the good centering control means, may be focused against a replaceable wear member, to reduce wearing against the rest of the mold. Thus, maintenance of the mold in good operating condition is greatly simplified, and the mold can operate for an indefinite period of time without the need for extensive reworking.

While centering ring 22 is shown in the above embodiment to be carried by the mold core and wear ring 28 to be carried by the mold cavity, it can be readily seen that the respective parts could be reversed so that a wear ring or other wear member could be carried by the mold core and centering rib means could be carried by the mold cavity. Such a simple modification could be made while still making use of the invention of this application and achieving its advantages.

The above has been offered for illustrative purposes only, and is not intended to limit the scope of the invention of this application, which is as defined in the claims below.

That which is claimed is:

1. In a mold which comprises a mold core and a mold cavity moveable between open and closed positions and together defining a molding chamber in the closed position, and sprue means for supplying plastic molding compound to the molding chamber in the closed position, said mold core and mold cavity defining a parting line between them in the closed position, and one of said mold core and mold cavity defining centering rib means at said parting line defining radially inner and outer surfaces, which rib means projects into a groove defined by the other of said mold core and mold cavity in the closed position to center said mold core and cavity, the improvement comprising, in combination:

a wear member removably secured in said groove at a position which is radially inward of said centering rib means, said wear member defining a radially outer face that is acutely angled outwardly from the longitudinal axis of said mold relative to said centering rib means, the radially inner surface of said centering rib means defining a plane parallel to said radially outer face and positioned whereby said radially outer face and radially inner surface abut each other in the closed position, said radially outer surface of the centering rib means being acutely angled inwardly relative to said longitudinal axis and centering rib means, said radially outer surface being parallel to and in substantially abutting relation with the radially outer side of said groove in the closed position, the radially inner and outer surfaces of the centering rib means serving as at least part of means for preloading said wear member in the closed position, whereby wear to the mold in operation is focused on the wear member upon mold opening.

2. The mold of claim 1 in which said wear member is made of a softer material than said centering rib means.

3. The mold of claim 1 in which said centering rib means and said groove are of annular shape, surrounding said molding chamber.

4. The mold of claim 3 in which said wear member is of annular shape, surrounding said molding chamber.

5. The mold of claim 1 in which said wear member is of annular shape, surrounding said molding chamber.

6. The mold of claim 1 in which said wear member has the cross-sectional shape of a parallelogram.

7. The mold of claim 1 in which the radially outer face of the wear member and the radially inner surface of the centering rib means are acutely outwardly angled at 5 to 30 degrees.

8. The mold of claim 7 in which the radially outer surface of the centering rib means and the radially outer side of said groove are acutely angled inwardly at an angle of 10 to 45 degrees, said last-named angle being greater than the angle of the radially outer face of the wear member.

9. The mold of claim 8 in which said radially outer face of the wear member and the radially inner surface of the centering rib means are acutely outwardly angled at 10 to 20 degrees.

10. The mold of claim 9 in which said radially outer surface of the centering rib means and the radially outer side of said groove are acutely inwardly angled at 15 to 30 degrees.

11. The mold of claim 1 in which said centering rib means is carried by the mold core.

12. In a mold which comprises a mold core and a mold cavity movable between open and closed positions and together defining a molding chamber in the closed position, and sprue means for supplying plastic molding compound to the molding chamber in the closed position, said mold core and mold cavity defining a parting line between them in the closed position, said mold core defining centering rib means at said parting line defining radially inner and outer surfaces, which rib means projects into a groove defined by said mold cavity in the closed position to center said mold core and cavity, the improvement comprising, in combination:

a wear member removably secured in said groove at a position which is radially inward of said centering rib means, said wear member defining a radially outer face that is acutely angled outwardly from the longitudinal axis of said mold relative to said centering rib means, the radially inner surface of said centering rib means defining a plane parallel to said radially outer face and positioned whereby said radially outer face and radially inner surface abut and preload each other in the closed position, said radially outer surface of the centering rib means being acutely angled inwardly relative to said longitudinal axis and centering rib means, said radially outer surface being parallel to and in substantially abutting relation with a radially outer side of said groove in the closed position, the radially inner and outer surfaces of the centering rib means serving as at least part of means for preloading said wear member in the closed position, whereby wear to the mold in operation is focused on the wear member upon mold opening and the mold core and cavity may be precisely transversely positioned to each other in the closed position during molding.

13. The mold of claim 12 in which said wear member is made of a softer material than said mold core and cavity.

14. The mold of claim 13 in which said centering rib means and said groove are of annular shape, surrounding said molding chamber.

15. The mold of claim 14 in which said wear member is of annular shape, surrounding said molding chamber.

16. The mold of claim 15 in which said wear member has the cross-sectional shape of a parallelogram.

17. The mold of claim 15 in which the radially outer face of the wear member and the radially inner surface of the centering rib means are acutely outwardly angled at 5 to 30 degrees.

18. The mold of claim 17 in which the radially outer surface of the centering rib means and the radially outer side of said groove are acutely angled inwardly at an angle of 10 to 45 degrees, said last-named angle being greater than the angle of the radially outer face of the wear member.

19. The mold of claim 18 in which said radially outer face of the wear member and the radially inner surface of the centering rib means are acutely outwardly angled at 10 to 20 degrees.

20. The mold of claim 19 in which said radially outer surface of the centering rib means and the radially outer side of said groove are acutely inwardly angled at 15 to 30 degrees.

21. The mold of claim 20 in which said centering rib means is carried by the mold core.

22. In a mold which comprises a mold core and a mold cavity moveable between open and closed positions and together defining a molding chamber in the closed position, and sprue means for supplying plastic molding compound to the molding chamber in the closed position, said mold core and mold cavity defining a parting line between them in the closed position, and one of said mold core and mold cavity means defining centering rib means at said parting line defining radially inner and outer surfaces, which rib means projects into a groove defined by the other of said mold core and cavity to center said, in said cavity the improvement comprising in combination:

a wear member removably secured in said groove at a position which is radially inward of said centering rib means, said wear member defining a radially outer face that is acutely angled outwardly at 5 to 30 degrees from the longitudinal axis of said mold relative to said centering rib means, the radially inner surface of said centering rib means defining a plane parallel to said radially outer face and positioned whereby said radially outer face and radially inner surface abut each other in the closed position, said radially outer surface of the centering rib means being acutely angled inwardly at an angle from 10 to 45 degrees relative to said longitudinal axis and centering rib means, said last-named angle being greater than the angle of the radially outer face of the wear member, said radially outer surface being parallel to and in substantially abutting relation with the radially outer side of said groove in the closed position, whereby wear to the mold at operation is focused on the wear member upon mold opening.

23. In a mold which comprises a mold core and a mold cavity, moveable between open and closed positions and together defining a molding chamber in a closed position, and sprue means for supplying plastic molding compound to the molding chamber in the closed position, said mold core and mold cavity defining a parting line between them in the closed position, said mold core defining centering rib means at said parting line defining radially inner and outer surfaces, which rib means projects into a groove defined by mold cavity in the closed position to center said mold core and cavity, the improvement comprising, in combination:

a wear member secured in said groove at a position which is radially inward of said centering rib means, said wear member defining a radially outer face that is acutely angled outwardly at 5 to 30 degrees from the longitudinal axis of the mold relative to said centering rib means, the radially inner surface of said centering rib means defining a plane parallel to said radially outer face and positioned whereby said radially outer face and radially inner surface abut and preload each other in the closed position, said radially outer surface of the centering rib means being acutely angled inwardly at 10 to 45 degrees relative to said longitudinal axis and centering rib means, said last-named angle being greater than the angle of the radially outer face of the wear member, said radially outer surface being parallel to and in substantially abutting relation to the radially outer side of said groove in the closed position, whereby wear to the mold in operation is focused on the wear member upon mold opening.

24. The mold of claim 23 in which said wear member is made of a softer material than said mold core and cavity.

25. The mold of claim 24 in which said centering rib means, said groove, and said wear member are of annular shape, surrounding said molding chamber.

26. The mold of claim 24 in which said radially outer face of the wear member and the radially inner surface of the centering rib means are acutely outwardly angled at 10 to 20 degrees.

27. The mold of claim 26 in which said radially outer surface of the centering rib means and the radially outer side of said groove are acutely inwardly angled at 15 to 30 degrees, said angle being greater than the angle of said radially outer face of the wear member and radially inner surface of the centering rib means.

* * * * *